United States Patent [19]

Husted

[11] Patent Number: 5,236,022
[45] Date of Patent: Aug. 17, 1993

[54] LID WITH BUILT-IN DISPENSING SCOOP

[76] Inventor: Wayne D. Husted, 2960 Scott St., San Francisco, Calif. 94123

[21] Appl. No.: 717,991

[22] Filed: Jun. 20, 1991

[51] Int. Cl.[5] .................... B65B 1/06; G01F 11/06
[52] U.S. Cl. .................... 141/358; 141/354; 141/351; 141/319; 141/320; 141/110; 141/108; 220/411
[58] Field of Search ............... 141/358, 351, 352, 353, 141/354, 357, 360, 362, 387, 319, 320, 321, 322, 108, 110; 220/411

[56] References Cited

U.S. PATENT DOCUMENTS

| | | | |
|---|---|---|---|
| 465,090 | 12/1891 | Willson | 141/358 |
| 674,168 | 5/1901 | Kinnard | 141/358 |
| 1,419,338 | 6/1922 | Wieneke | 141/358 |
| 1,635,159 | 7/1927 | Bergmann | 141/360 |
| 1,653,896 | 12/1927 | Emerson | 141/358 |
| 1,988,122 | 1/1935 | Horkavi | 141/358 |
| 2,339,665 | 1/1944 | Alman | 220/411 X |
| 3,349,941 | 10/1967 | Wanderer | 220/411 X |
| 4,130,149 | 12/1978 | Hausam | 141/358 |
| 4,166,487 | 9/1979 | Spies | 141/358 |
| 4,232,718 | 11/1980 | Wippermann | 141/358 |

FOREIGN PATENT DOCUMENTS

633017 6/1936 Fed. Rep. of Germany ...... 141/358

*Primary Examiner*—Ernest G. Cusick
*Attorney, Agent, or Firm*—Kinney & Lange

[57] ABSTRACT

A hollow lid (14) with a built-in scoop (25) combines with an integrated sliding blade (18) to form a single mechanical system for the removal of dry foodstuffs. The scoop and cut-off blade are integrated mechanically, and function in concert, so as to permit the scoop to connect with the blade to pull the blade over a dispensing hole (36B), thereby blocking the flow of dry foodstuffs while at the same time allowing the scoop to release freely from claws (54) that hold the scoop while the blade blocks the flow of material and permits the scoop to be removed from the jar or container lid with the scoop's measured contents that have filed the scoop by gravity flow.

28 Claims, 6 Drawing Sheets

LID WITH BUILT-IN DISPENSING SCOOP

BACKGROUND OF THE INVENTION

This invention relates to food containers, and particularly to a novel lid for dry food storage containers.

In the past, kitchen type storage containers for consumer markets have been extremely inefficient in dispensing and measuring quantities of dried foodstuffs, including powders. It is not an exaggeration to claim that every kitchen and at least half of the offices in the world store common dry foods like coffee, sugar, powdered milk substitutes, and the like, in jars and containers with removable lids. Opening and closing a kitchen storage container is usually not an efficient nor a pleasant way to access its contents. Scooping or spooning most dry foodstuffs from kitchen canisters is inefficient and cumbersome at best, and often results in spilling the granular or powdered food in the process of extracting it.

Opening most bags, jars and other containers for such food stuffs requires two hands, one hand to hold the bag or jar while the other hand unfolds the top of a bag or unscrews or unlatches the lid of a jar. Although many commercial packages include a scoop in the container, this creates a dilemma. When a jar or canister is full, there are a limited number of places to store the scoop, and this presents a very annoying problem. The scoop is usually tossed into a drawer full of other kitchen utensils where it is difficult to find.

Scoops, when not stashed in the jar of dry stuffs, are usually stored in drawers full of other small kitchen tools. This renders a scoop hard to find at the time when it is most urgently needed, such as to fill a coffee filter, scoop sugar or flour into a waiting recipe, or (what is even more urgent) to prepare a baby's bottle with powdered formula when one can't find the essential measuring scoop and the infant is crying. It is very frustrating to have to search for misplaced or lost measuring scoops. When scoops are jammed into the contents of a canister, the user is confronted with messy handles and the daunting challenge of avoiding the scattering of dry material when the scoop is removed. As if these awkward inconveniences are not annoying enough, many canisters, bags, and cans also have top openings that are too small to allow a normal-sized hand to reach their contents even with a scoop. When a container is half empty, even a small hand may not be able to reach far enough into the jar or container to comfortably scoop out dry material.

Many commercial dispensers use the principle of inverting a container and allowing gravity to feed material to a lower port, door, or slot, thereby limiting access to the ingredients and dispensing controlled amounts of material. Some commercial uses of gravity flow principle are: inverted containers that supply grain and water for animals, hardware store dispensers for nails, and gum, cigarette and candy dispensing machines. There are also less familiar uses for gravity flow and measurement such as the shell loaders used by Civil War soldiers to fill empty bullet shells with gunpowder. By using invertible containers that were attached to his belt, a soldier could crudely measure out enough gunpowder to fill a given shell size.

Most gravity flow dispensers are exclusively for commercial use. The limited number of consumer products that have used gravity flow for dispensing a container's contents have been crude, clumsy, poorly styled, and very inefficient in measuring controlled quantities of material. Consumer type products for the home which use gravity flow to dispense have been limited to nineteenth-century type kitchen cabinets with built-in flour, sugar, and rice storage, for instance, whereby dry foodstuffs were loaded from the top and funnelled to the bottom for removal, through trap doors of comparatively large sizes. Any take out type scoops for these early dispensing containers were ill-fitting, messy, inefficient, and did not permit accurate measuring. Early kitchen dispensers were little more than clumsy hoppers that emptied out as one withdrew a sliding board. The user had to guess in advance when to shut the supply off before it overflowed onto the counter or floor. Prior to my invention, a jar's lid typically had to be opened to measure and access its contents, and the contents had to be extracted with a loose spoon or scoop.

SUMMARY OF THE INVENTION

The present invention is a dispensing apparatus for use with a container of dry particulate material, such as food products. The apparatus includes a lid with a built-in scoop. The scoop is normally positioned within the lid, and can be removed to dispense a measured amount of the particulate material from the container.

In preferred embodiments of the present invention, the scoop cooperates with a cut-off blade. When the scoop is in position within the lid, a mouth of the scoop is positioned below a dispensing opening in the lid so that particulate matter can pass through the dispensing opening and into the mouth of the scoop. When the scoop is pulled from the lid, the scoop pulls the blade into a position that blocks the dispensing opening and then disconnects from the blade so that the scoop can be removed entirely from the lid.

DETAILED DESCRIPTION OF THE PREFERRED EMBODIMENTS

Figure 1:
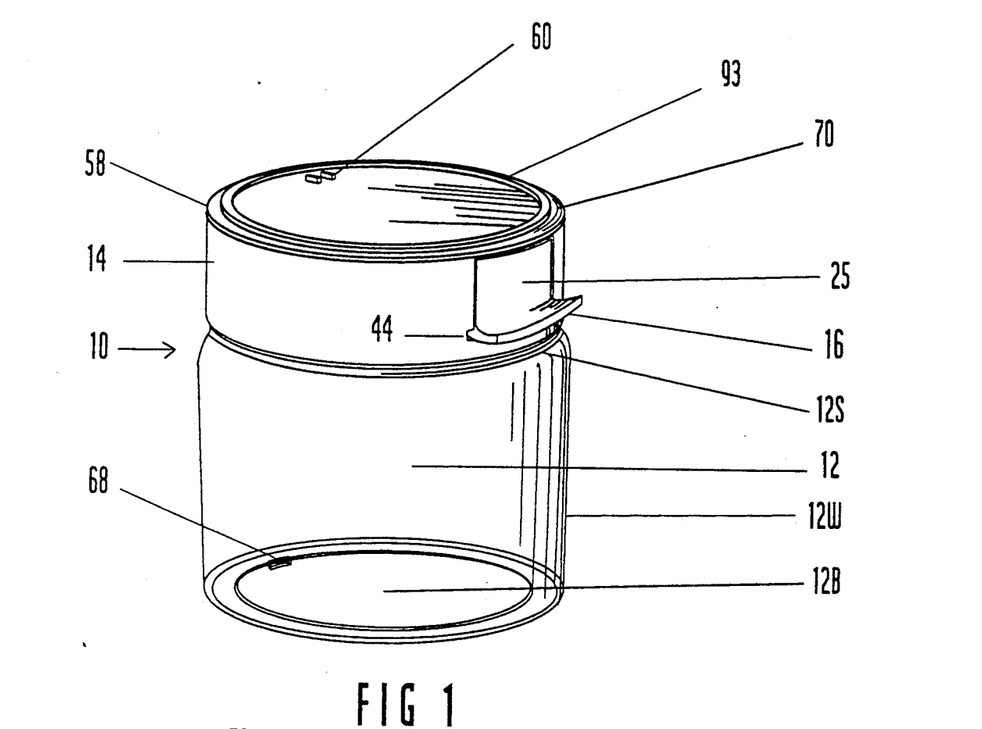
FIG. 1 shows an isometric view of lid and scoop in position on a container according to my invention for removing lid and filling container.
Figure 2:
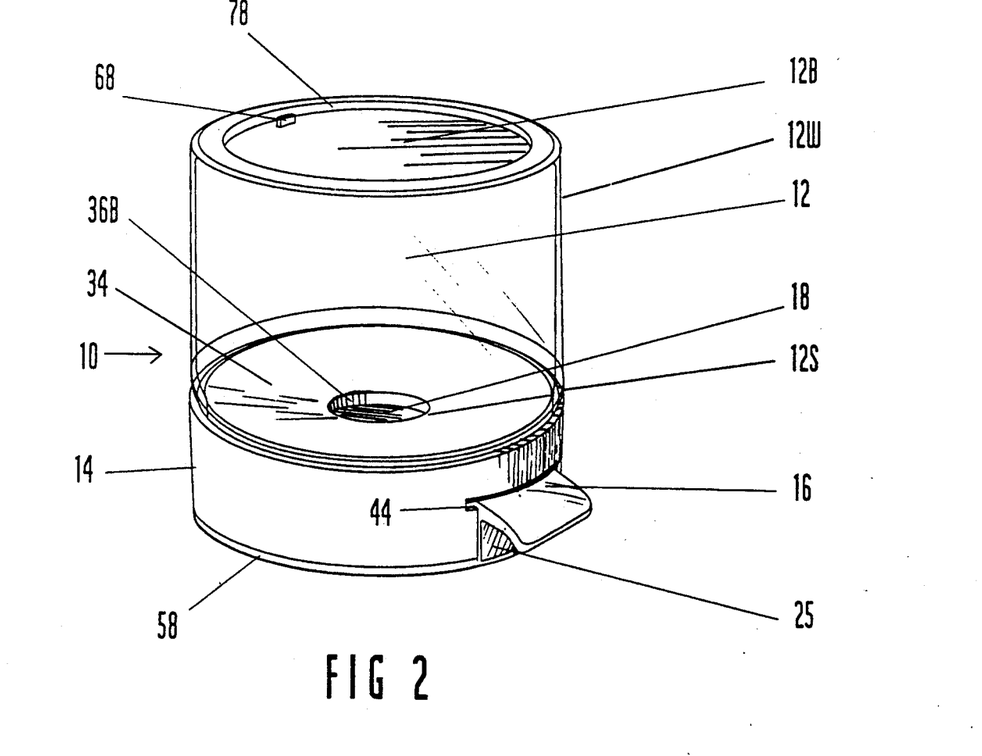
FIG. 2 shows an isometric view of lid and scoop inverted for dispensing material.
Figure 3:
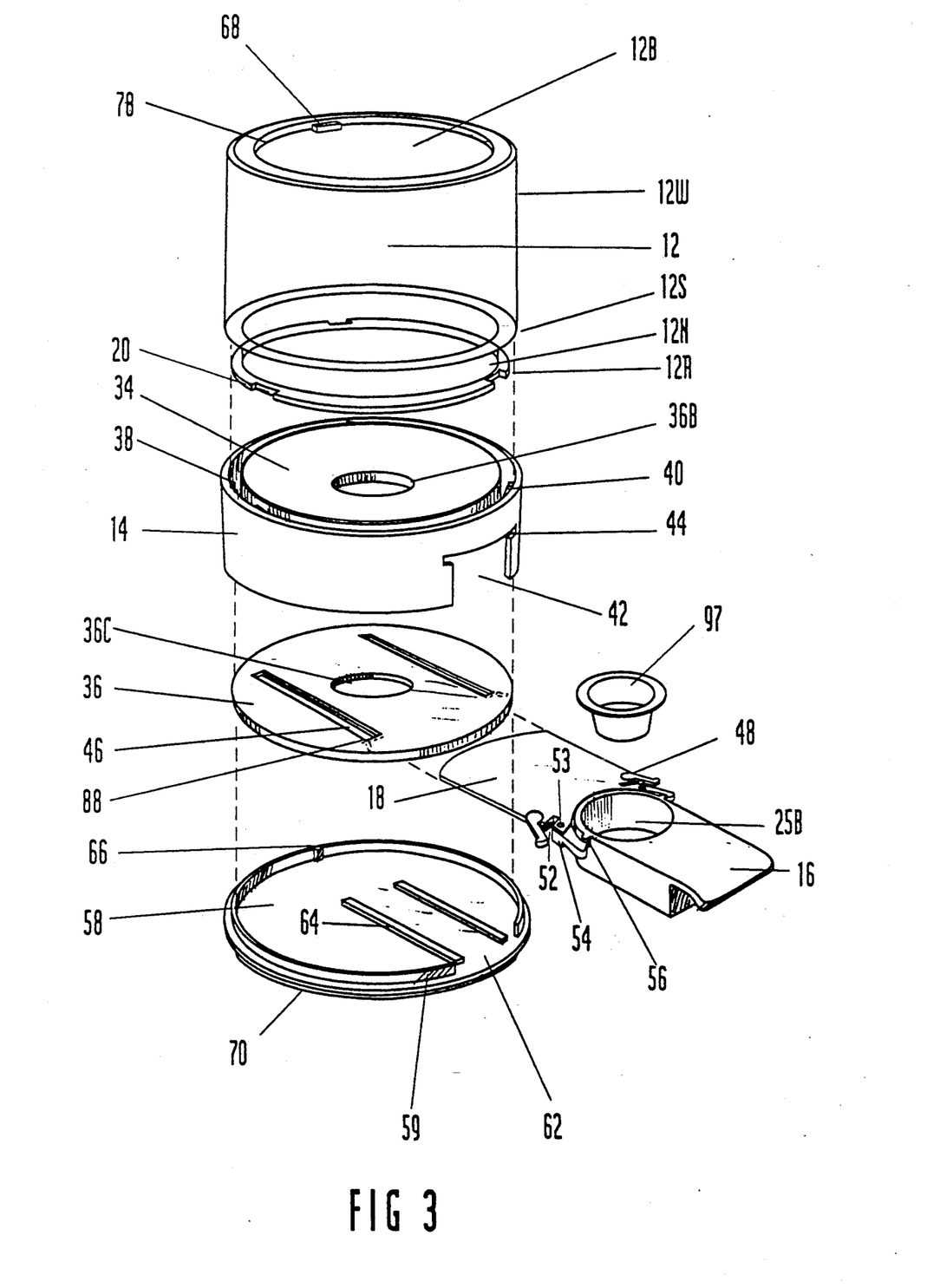
FIG. 3 shows an exploded, isometric view of container with the lid with built-in scoop.

A typical embodiment of the lid with a built-in dispensing scoop is shown in FIGS. 1-3, which illustrate dispensing system 10, which includes container 12, lid 14, scoop 25, and blade 18.

In FIG. 1, system 10 is oriented so that container 12 is located below lid 14. This is the orientation of system 10 when lid 14 is to be removed so that container 12 can be filled with a dry food product such as coffee, sugar, candy, nuts or the like.

FIG. 2 shows system 10 inverted to its normal operating position with container 12 above lid 14. In this orientation, a measured amount of the dry food product can be dispensed by pulling scoop 25 out of lid 14.

FIG. 3 is an exploded view with container 12 located above lid 14, as in FIG. 2. As best shown in FIG. 3, container 12 includes bottom 12B, cylindrical side wall 12W, neck 12N and rim 12R. Container 12 is preferably made of a durable plastic such a polycarbonate, or of glass so that the user may see the contents of the container 12.

As shown in FIG. 3, rim 12R includes three circumferentially spaced notches 20. On the bottom 12B, ring shaped seat 78, and indexing lug 68 are provided.

Lid 14 includes blade guide 36 and bottom plate 58. Lid 14 has conical end 34, with central hole 36B, and receiving groove 38, for receiving rim 12R of container 12. Lugs 40 are located on an inner surface of lid 14 in groove 38. Lugs 40 mate with notches 20 in rim 12R.

Mouth 42, in lid 14, has slot 44 at an upper end. Scoop 25 is inserted into and removed from lid 14 through mouth 42.

Blade guide 36 has slot 46 in which blade 18 slides, and hole 36C that aligns with central hole 36B for dry material to fall through into scoop cavity 25B. Blade 18 is preferably made of a wax-like plastic material such as nylon and is constructed so as to move within blade guide 36. Capacity adapter 97 that can be snapped into underneath side of scoop 25, as is best shown in FIG. 5, or can be inserted into scoop cavity 25B to provide a second, smaller cavity for receiving the dry material.

Scoop 25 is filled with dry material from dispensing system 10 when scoop 25 is inserted into lid 14, since it is indexed under central blade holder hole 36C. When scoop 25 is withdrawn through mouth 42 in lid 14, scoop 25 pulls blade 18 along slot 46, thereby covering central hole 36B and preventing material from falling through conical end 34, central hole 36B and central blade holder hole 36C. Once blade 18 is in place under central hole 36B, blade snap 48 is forced into blade snap socket 47 by snap spring 52 which is received by spring cavity 19. Since blade 18 is thereby stopped, hinged swivel claw 54 is forced open by pressure from scoop lug 56 and turns outward on hinge pin 53. Scoop 25 is now free from blade 18, and may be removed from lid 14 through mouth 42.

Bottom plate 58 contains a flange 59 for ensuring a tight fit into lid 14. Opening 62 in flange 59 allows scoop 25 to be inserted and withdrawn. Scoop riser 64 in plate 58 forces scoop 25 against blade guide 36. Bottom plate 58 also contains indexing lug 66, as best seen in FIG. 5, to align bottom plate 58 with lid 14, so that mouth 42 is aligned with opening 62 in flange 59. Bottom plate 58 also contains female lug indexer 60, best seen in FIG. 6, that mates with male jar top lug 68 (FIG. 6). Bottom plate 58 has foot 70 with groove 72 for holding non slip ring of rubber-like material 93, all best seen in FIG. 6.

Figure 5:
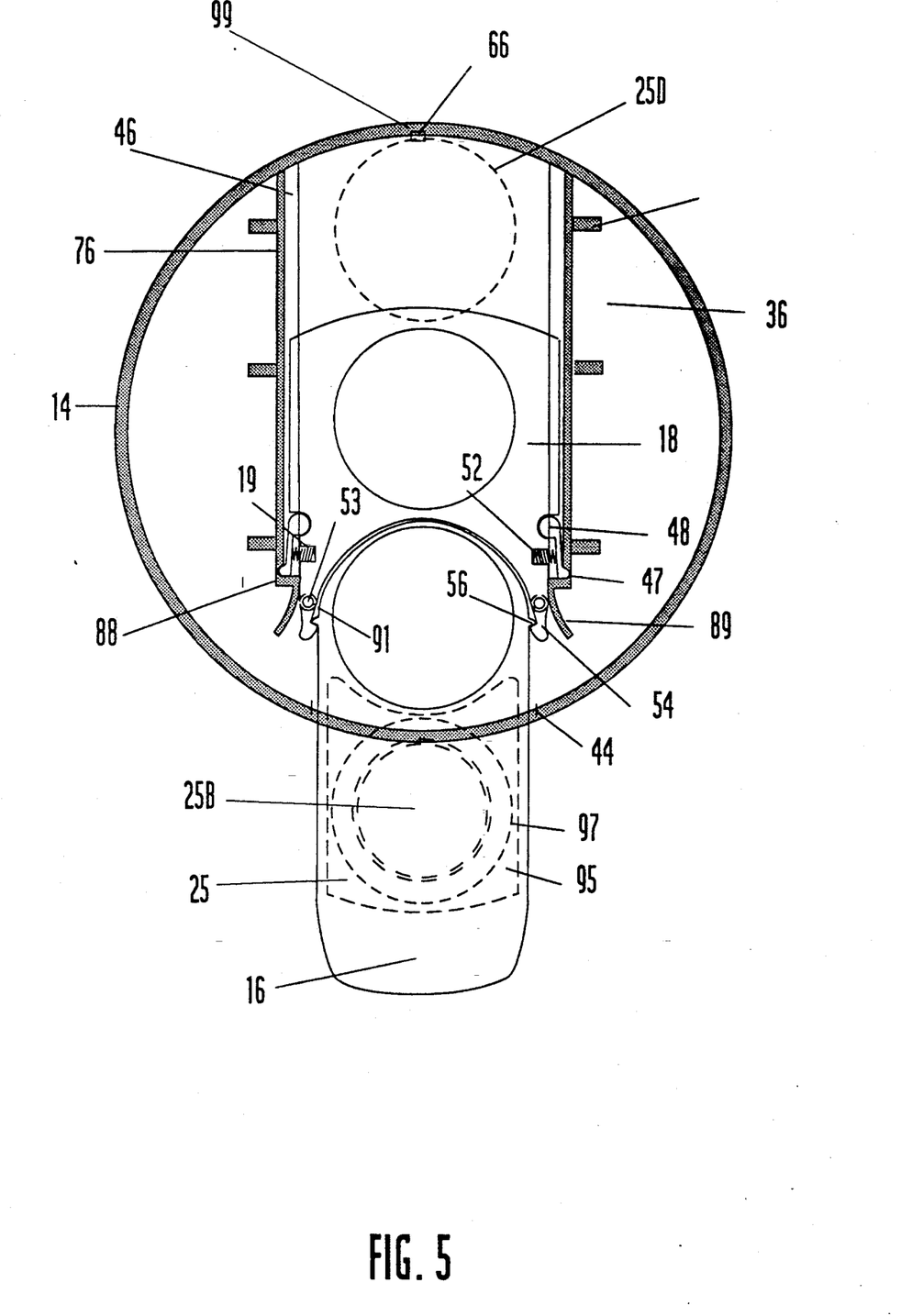
FIG. 5 shows a cut away plan view of a scoop with a capacity adapter and blade.
Figure 6:
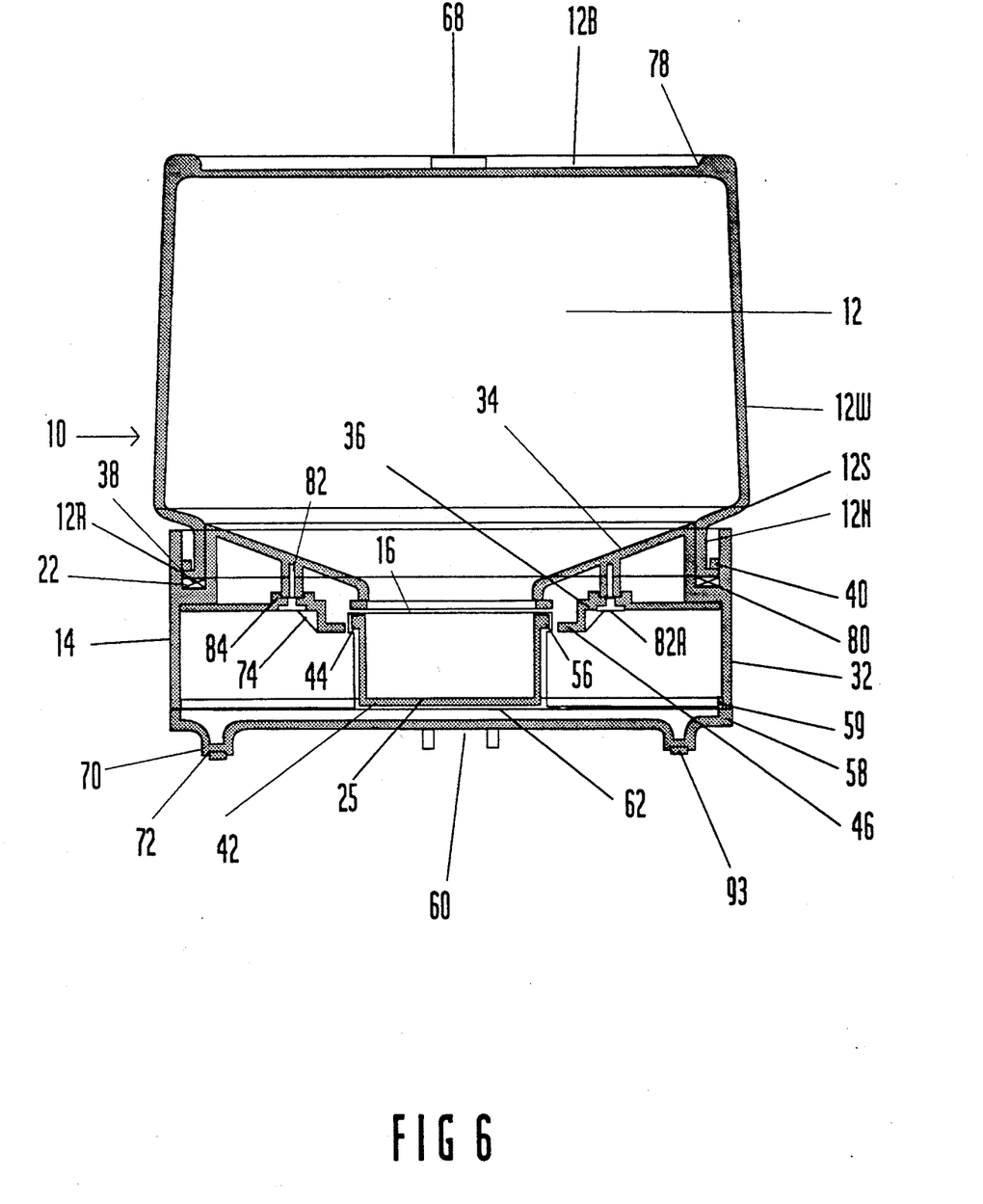
FIG. 6 shows a cross section of an assembled dispensing system.

FIG. 5 is a plan cut-a-way view of lid 14 which demonstrates that a diameter for scoop 25D determines an outside diameter of lid case 14 since a diameter of center hole 36B, FIG. 3, must match a diameter of a top of scoop cavity 25B. Lid 14 then must have a diameter of three times a diameter of scoop cavity 25B. Thus a diameter of scoop cavity 25B becomes a critical dimension since lid 14 must be of a size three times the diameter of scoop cavity 25B, in order to allow blade 18 to cover and uncover center hole 36B and central blade holder hole 36C, while permitting scoop 25 to release from blade guide 36.

Figure 7:
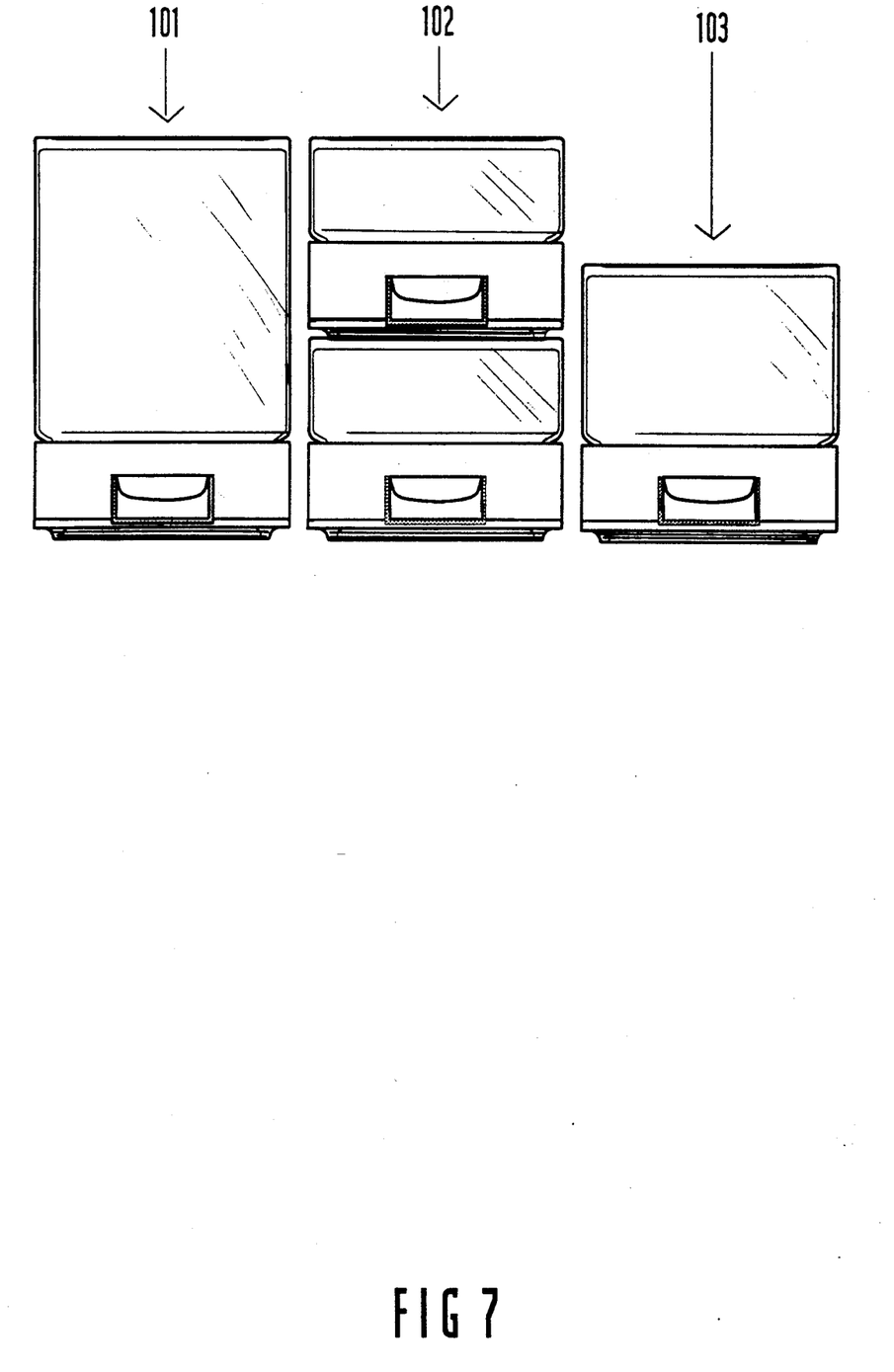
FIG. 7 shows a typical modular system for constructing sets of canisters.

Slot stiffener 74 (shown in FIG. 6) keeps slot 46 even and rigid so that blade 18 travels smoothly and so that blade snap 48 does not distort an edge of blade slot 76. Foot 70 in bottom plate 58 is sized to fit into a ring shaped seat 78 of another similar dispensing system to permit stacking (as shown in FIG. 7).

Rubber like ring 80 is fitted into a ring shaped seat 22 so that a jar rim 12R is forced into an air tight position by pressure from a lug 40 in a lid 14.

As best seen in FIG. 6, blade guide 36 is held tightly against lid 14 by a screw 82A in a screw hole 82 that is seated into an indexing sprue 84.

Figure 4A:
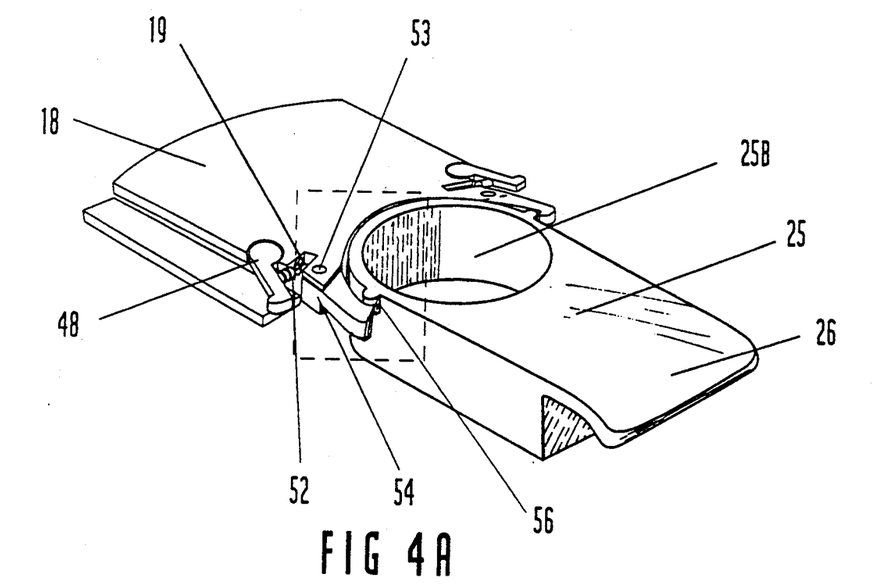
FIG. 4A shows a blade with blade stops, with scoop attached by hinged scoop grips in an isometric view.
Figure 4B:
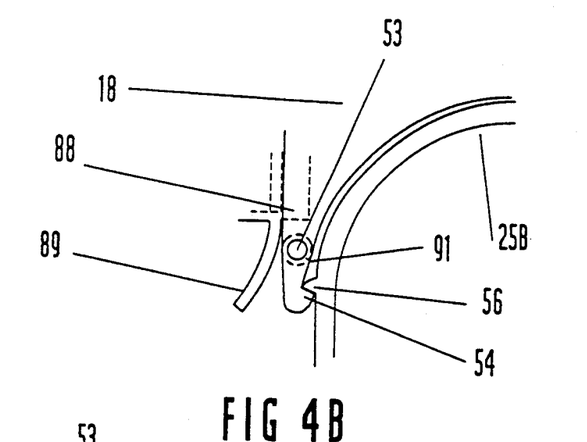
FIGS. 4B and 4C shows plan and elevation views of detail of hinged scoop grips attached to scoop lug.
Figure 4C:
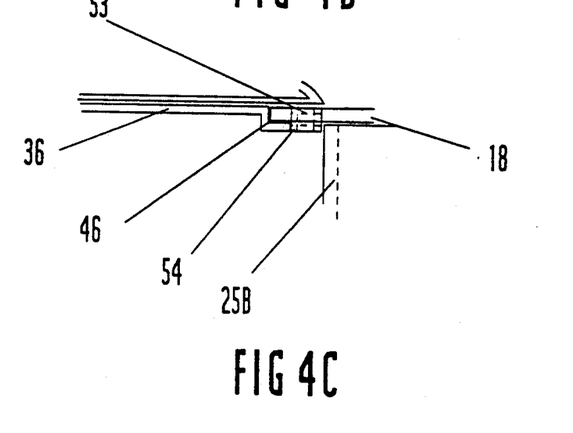

As best seen in FIGS. 4B and 4C, hinged swivel claw 54 extends below slot 46 and is captured by, and rides on, edge 76 of blade slot 46. This feature prevents a scoop 25 from uncoupling from blade 18 until blade 18 has fully covered central hole 36B, and central blade hole 36C. Once hinged swivel claw 54 travels beyond a blade slot end 88, scoop lug 56 is released and hinged swivel claw 54 can swing open freely along swivel claw release 89. Swivel hinge catch 91 prevents hinged swivel claw 54 from swinging inward and assures that hinged swivel claw 54 will not swing inwardly so as to block a re-entry of scoop 25 into blade 18.

As best seen in FIG. 6, female indexing lug 60 is placed so that is indexes with male indexing lug 68 thereby keeping a stack of containers 101, 102, 103 aligned so that scoop 25 is aligned to the front of a container 101, or a container 102, or a container 103.

In a preferred embodiment, container 12 is an injection molded assembly formed by ultrasonically bonding neck 12N to side wall 12W at sealed joint 12S. The location of sealed joint is significant, because it permits the main body of container 12 to be injection molded as a unit because there is no undercut. Instead, neck 12N has an undercut (an area of reduced diameter), which is possible because both ends of neck 12N are open (whereas the main body of container 12 has a closed end —bottom 12B). Sealed joint 12S allows dispensing system 10 to vary in capacity when a container main body of a different height is attached to container neck 12N.

Operation

The manner of using the lid with a built-in scoop is to remove lid 14 from container 12 and fill container 12 in the identical way that containers are filled in present use. Dispensing system 10 is opened by turning the container 12 in a counter clockwise direction to release lug 40 from rim 12R via notch 20. After filling, container 12 is sealed by turning lid 14 in the clockwise direction so that notch 20 falls over lug 40 and is tightened against rubber like ring 80 in receiving groove 38 and against ring shaped seat 22.

Once container 12 is filled in FIG. 1 position, it is inverted (FIG. 2) so that scoop 25 fills with dry particulate material through gravity flow and is ready to be removed. As shown in FIGS. 3 and 4A–4C, scoop 25 is now withdrawn from lid 14 by pulling scoop handle 16, which in turn pulls blade 18 along blade slot 46 (that is buttressed by slot stiffener 74). Scoop 25, which may have capacity adaptor 97 removed from adapter space 95, and inserted into scoop cavity 25B, is held firmly within blade slot 46 by blade snap 48 which is pressed against edge 76 of slot 46 through pressure from snap spring 52.

Once scoop 25 has pulled blade 18 far enough to cover central blade holder hole 36C and central hole 36B, blade snap 48 is forced into blade slot end notch 47 by the pressure from the snap spring 52. With blade 25 now stopped by blade slot end 88, pulling on scoop handle 16 forces hinged swivel claw 54 to swing on pin 53, and releases scoop lug 56 which passes through scoop lug slot 44, after separating from hinged swivel claw 54. Swivel hinge catch 91 stops hinged swivel claw 54 from swinging inward and the hinged swivel claw release 89 limits the outward swing of hinged swivel claw 54. Scoop 25 may now be freely removed from lid 14 and its measured contents removed.

Upon replacing scoop 25, the above process is reversed. That is, blade 18 is held firmly in place by blade snap 48 into blade slot end notch 47. Scoop 25 is pushed into blade 18 and forces blade 18 to travel along slot 46, which is held rigid by slot stiffener 74. As scoop 25 and blade 18 travel in slot 46, blade snap 48 compresses the snap spring 52 and forces hinged swivel claw 54 to grip scoop lug 56 due to the pressure exerted from hinged swivel claw 54 riding along slot 46. Blade 18 and scoop 25 are stopped when they contact lid case 14, and scoop cavity 25B is now positioned under central hole 36B and conical end 34 which has central hole 36B. In this position, scoop 25 is now refilled by gravity flow with dry particulate material.

As illustrated in FIG. 7, dispensers are stacked by orienting the dispensers in inverted positions. Foot 70 with rubber like material ring 93 of one dispenser is placed into ring shaped seat 78 of another dispenser so that male indexing lug 60 locks over indexing lug 66 in bottom plate 58.

For cleaning lid 14, bottom plate 58 is removed, the inside cleaned and bottom plate 58 replaced by inserting indexing lug 66 in flange slot 99, which is in lid 14 and opposite mouth 42, as shown in FIG. 5. By indexing lug 66 into slot 99, scoop riser 64 is positioned parallel to the bottom of scoop 25 and forces scoop 25 and blade 18 into a snug fit against blade guide 36.

Ramifications

It is axiomatic that the more air tight the lid on a container, the more difficult it is to remove the lid to get at its contents. Consequently consumers must settle for loose fitting tops if they want easy access to a jar or storage container. My invention allows a container to be filled with dry materials and the container than inverted to allow the dry materials to feed by gravity into the top, which has through inversion become the bottom. Once inverted the dry materials stored in the container can be removed in measured amounts through an internal mechanism within the container's lid which through the inversion has become the container's base. The mechanism within the lid is greatly simplified over any earlier dispensers since it is comprised of an integral scoop that is fully contained within a container's lid and further is coupled with a sliding blade that stops the flow of material as a full scoop of material is withdrawn from a container. Material can be extracted using one hand instead of two. The much-used scoop does not compete for space within crowded kitchen drawers. The handle of the scoop remains clean. Extracting material is faster than having to open and close a lid. Scoops are no longer lost or misplaced. Material is no longer scattered over the floor and counter top. Any size hand can extract material, without the awkward limitation of access to a jar because of jar mouths that are smaller than human hands. More efficient principles of food storage and dispensing are no longer limited to commercial use, and home owners may enjoy even greater efficiency. Measurements are precise and adjustable. Less hand strength is needed to pull the scoop than to unscrew or uncap a conventional container or jar. This is of particular value to users with physical handicaps such as arthritis.

The blade and scoop are coupled in such a manner as to allow the scoop to fill by gravity. When the scoop is removed, the flow of dry material is cut off by a blade that the scoop drags smoothly along a guide. Once the blade has cut off the flow of dry material, my mechanism allows the scoop to uncouple from the blade so that the scoop and its contents can be removed from the container in a smooth and simple manner. Conversely, when the scoop is reinserted into the hollow lid of the container, it is recoupled with the blade and pushes the blade from under the filling hole so that the scoop has now automatically replaced the blade and is filled with dry material by gravity fill. In addition, the scoop has a snap-in adapter for quick and easy control of a variety of measured quantities.

By enlarging a container's lid and making it into a hollow matrix or housing, the lid may become a dispensing system that incorporates a measuring scoop. Further, the scoop and lid may be mechanically connected by a cut-off element to permit not just the efficient extraction of material from a jar or container, but at the same time the measuring of material in the process of extracting the material. By building the scoop into the lid many annoying and common problems are solved.

It is not an exaggeration to say that every home has storage jars and containers. Most of these have lids. The lid with built-in scoop of the present invention can make these jars and containers infinitely easier to use and keep their contents fresher. No more searching for lost scoops in crowded kitchen drawers. No more spilling granular foods as happens when a scoop full of fine grains is awkwardly extracted through the rim of a tight mouthed jar or container. No more letting air in every time material is removed so the contents of a container employing the lid with built-in scoop remain fresher. Now jars and containers can be efficiently stacked on shelves, in cabinets or in refrigerators because there is no need to open the lid each time material is extracted. Contents can be removed with greater ease and efficiency. The contents remain safer and freer from insects and contamination. The scoop is built into the container's lid and becomes a visually pleasing part of the container itself. Adapters can be inserted and removed with ease and stored conveniently within the scoop itself. Jars and containers can now be stored more efficiently in refrigerators since space is not needed to lift open awkward lids. Jars and containers can be stored under lower kitchen cabinets since the space needed for opening the lids of conventional containers is eliminated. Jars and containers can be stacked on top of each other and their contents removed without unstacking the filled containers. One can now simply withdraw from the lid an internal scoop that is always full of a measured amount of the container's contents.

Although the present invention has been described with reference to preferred embodiments, workers skilled in the art will recognize that changes may be made in form and detail without departing from the spirit and scope of the invention.

What is claimed is:

1. For use with a container for dry, particulate material where the container has a predetermined size and has an opening, a device for closing the opening of the container and for enabling the dry, particulate material to be accurately and easily dispensed from the container, the device comprising:

a lid for sealably closing the opening of the container, the lid including means for attaching the lid to the container so as to close the opening of the container and for enabling the lid to be removed from the container for allowing the container to be filled and cleaned via the opening;

a scoop having a diameter;

means for storing the scoop within the lid and enabling the scoop to be removed from the lid; and filling means for filling the scoop with material from the container when the scoop is stored within the lid and the container is oriented so that the lid is below the container and acts as a base for supporting the container; and closing means for preventing the dry, particulate material from running out of the container when the scoop is removed from the lid; wherein the lid has an overall diameter in proportion to the diameter of the scoop so that the closing means is contained within the lid; and coupling means integral with the closing means for coupling and uncoupling the closing means from the scoop; wherein the coupling means function within a same plane as the closing means.

2. The device of claim 1 wherein the filling means comprises a funnel

3. The device of claim 1 wherein the container has a circular cylindrical shape with a circular bottom and the opening thereof is an open circular top of the container.

4. The device of claim 1 wherein the scoop has a mouth and when the scoop is stored within the lid, the mouth occupies a predetermined position within the lid, and wherein the closing means comprises a blade which engages the scoop and is positioned over the predetermined position to block flow of material from the container when the scoop is removed from the lid.

5. The device of claim 1 wherein the filling means comprises a funnel and wherein the scoop has a mouth, and when the scoop is stored within the lid, the mouth occupies a predetermined position within the lid below the funnel; and wherein the closing means comprises a blade which is positioned over the predetermined position to block flow of material from the container through the funnel when the scoop is removed from the lid.

6. The device of claim 1 wherein the scoop has a handle which projects from the lid.

7. The device of claim 1 wherein the lid has a cylindrical shape with a circular side wall, and the side wall of the lid has an opening therein for receiving the scoop.

8. The device of claim 1 wherein the container has a bottom side opposite to the opening, the bottom side having an outside surface which is shaped so that when the outside surface of side bottom side is positioned upon a flat surface, the container will remain stable upon the flat surface; the lid containing an outside top surface which faces a direction opposite to that faced by the bottom side, the outside top surface being shaped so that when the container is inverted and the outside top surface is positioned upon the flat surface, the container will remain stable upon the flat surface.

9. The device of claim 1 wherein the scoop is of a same outside contour as the lid so that the outside contour of the scoop is smooth and contiguous with the outside contour of the lid.

10. The device of claim 1 wherein the scoop contains a holding cavity in addition to a measuring cavity of the scoop, and wherein the holding cavity holds a cup-like insert element capable of insertion into the measuring cavity for altering the capacity of the scoop.

11. The device of claim 1 and further including means for altering a capacity of the scoop without altering outside dimensions of the scoop.

12. The device of claim 1 wherein the lid has a removable end panel.

13. The device of claim 1 wherein the closing means includes a blade comprised of a wax like plastic material such as nylon and is constructed so as to move within the same plane as the coupling means which couple and uncouple the scoop and the blade.

14. The device of claim 1 wherein the coupling means comprise hinged claws that rotate to capture and release the scoop.

15. The device of claim 1 wherein the closing means further comprise means contained and functioning with the same plane as the closing means for latching the lid to the closing means as the scoop is removed from the lid and for unlatching the lid and the closing means as the scoop is inserted into the lid.

16. A dispensing system for dry, particulate material, the system comprising:

a container for containing the dry, particulate material, the container having a neck and an opening;

a housing attached to the container to cover the opening, the housing being positioned below the container, the housing including:

a cylindrical pillar, the pillar having a conical end, an outlet centered in the conical end through which material from the container may flow, and sidewalls which support the conical end; wherein the sidewalls mate with the neck of the container to provide a seal between the lid and the container; and means for attaching the housing to the container so as to close the opening of the container and for enabling the housing to be removed from the container for allowing the container to be filled and cleaned via the opening; and a slidable blade positioned within the housing having a first position in which the blade blocks the outlet and a second position in which the blade opens the outlet;

a scoop which is insertable into and removable from the housing, the scoop having a cavity for holding a measured quantity of the dry, particulate material, and the scoop engaging the blade to move the blade from the first position to the second position as the scoop is inserted into the housing so that the cavity is positioned below the outlet;

a track for supporting the blade and for supporting the scoop while the scoop is positioned within the housing; and coupling means contained and functioning within a same plane as the blade for coupling the scoop to the blade as the scoop is inserted into the housing and for decoupling the scoop from the blade as the scoop is removed from the housing.

17. The system of claim 16 wherein the container is an injection molded, multi-part assembly which includes:
- a cylindrical main body having an open end and a closed end, and a cylindrical side wall which ends at the open end; and
- a neck portion which is bonded to the open end of the main body.

18. A dispenser for dry, particulate material, the dispenser comprising:
- a container for containing the dry, particulate material, the container having a neck which defines an opening;
- a lid for sealably closing the opening of the container, the lid including:
  - a cylindrical pillar, the pillar having a conical end, a central opening centered in the conical end, and sidewalls which support the conical end; wherein the sidewalls mate with the neck of the container to provide a seal between the lid and the container; and
  - means for attaching the lid to the container so as to close the opening of the container and for enabling the lid to be removed from the container for allowing the container to be filled and cleaned via the opening;
- a scoop having a mouth, wherein the mouth occupies a predetermined position within the lid below the conical end when the scoop is stored within the lid, whereby the scoop is filled with material from the container when the scoop is stored within the lid and the container is oriented so that the lid is below the container and acts as a base for supporting the container;
- means for storing the scoop within the lid and enabling the scoop to be removed from the lid; and
- closing means for preventing the dry, particulate material from running out of the container when the scoop is removed from the lid.

19. The dispenser of claim 18 wherein the means for attaching comprises:
- a rim extending radially outward from the neck of the container and having notches; and
- a receiving groove encircling the cylindrical pillar and having lugs protruding into the groove, wherein the receiving groove receives the rim of the container and the lugs mate with the notches in the rim to attach the lid onto the container.

20. The dispenser of claim 18 wherein the scoop comprises:
- a handle which extends to a centered circular cup having a concave edge which mates with the closing means.

21. The device of claim 18 wherein the closing means comprises a blade which is positioned over the predetermined position to block flow of material from the container through the conical end when the scoop is removed from the lid.

22. The device of claim 21 wherein the closing means further comprises:
- a blade guide mounted to a bottom side of the conical end for guiding the blade below the central opening.

23. The device of claim 22 wherein the closing means further comprises:
- a blade snap hinged to the blade, a blade spring positioned between the blade guide and a free end of the blade snap, and a blade snap socket integral with the blade guide, whereby the blade spring forces the free end of the blade snap into the blade snap socket upon removal of the scoop from the lid so that the blade is latched to the lid to prevent the dry, particulate material from running out of the container and whereby insertion of the scoop into the lid compresses the free end of the blade snap and the blade spring to remove the blade snap from the blade snap socket so that the blade is unlatched from the lid and may be moved to allow the scoop to be filled through the filling means.

24. The dispenser of claim 18 further including means for stacking the dispenser above or below a similar dispenser.

25. The dispenser of claim 24 wherein the means for stacking comprises a female lug indexer on a top side of the lid and a male lug indexer on a bottom side of the container, whereby the female lug indexer mates with the male lug indexer to align the scoops when stacking similar dispensers.

26. The dispenser of claim 24 wherein the means for stacking comprises:
- a ring-shaped foot on a top side of the lid and a ring-shaped seat on a bottom side of the container whereby the foot mates with the seat to permit stacking of similar dispensers.

27. The dispenser of claim 26 wherein the foot contains a rubber-like material.

28. A dispensing system for dry, particulate material, the system comprising:
- a container for containing the dry, particulate material, the container having a neck which defines an opening;
- a scoop;
- a blade having means for coupling and uncoupling the scoop; and
- a lid for sealably closing the opening of the container, the lid including:
  - a first end, the first end comprising:
    - a central opening;
    - a conical end centered around the central opening which funnels into the central opening;
    - cylindrical sidewalls which encircle and enclose the conical end to provide a circular cavity below the conical end, wherein the cylindrical sidewalls include a mouth for receiving the scoop; and
    - means for attaching the lid to the container;
  - a flat circular disk shaped blade guide, the blade guide containing a hole centered in the blade guide, a slot emanating from a bottom side of the blade guide whereby the slot provides a track for the blade to travel along as the blade covers the central opening and covers the hole centered in the blade guide, and means for coupling the blade guide to the blade upon full insertion of the blade into the blade guide; whereby the blade guide fits within the circular cavity of the first end to align the central hole with the hole of the blade guide and to align the slot with a top edge of the mouth; and
- a second end comprising a flat circular bottom plate; wherein the plate has:
  - a flange emanating from a top side of the bottom plate near a perimeter of the bottom plate, whereby the flange fits within the circular cavity of the first end and ensures a tight fit between the bottom plate and the first end;
  - an opening within the flange; and
  - a scoop riser emanating upward from a topside of the bottom plate and extending from the opening within the flange to a center of the bottom plate, whereby the scoop riser forces the blade into the slot and forces the scoop into a snug fit against the blade guide.

* * * * *